US012724904B1

(12) United States Patent
Wickett et al.

(10) Patent No.: US 12,724,904 B1
(45) Date of Patent: Sep. 1, 2026

(54) AI-POWERED SECURITY ANALYSIS PLATFORM WITH MODULAR SCANNING ARCHITECTURE

(71) Applicant: DryRun Security Co., Austin, TX (US)

(72) Inventors: James Wickett, Round Rock, TX (US); Kenny Russell Johnson, Gainesville, VA (US)

(73) Assignee: DryRun Security Co., Austin, TX (US)

( * ) Notice: Subject to any disclaimer, the term of this patent is extended or adjusted under 35 U.S.C. 154(b) by 0 days.

(21) Appl. No.: 19/546,279

(22) Filed: Feb. 20, 2026

Related U.S. Application Data

(60) Provisional application No. 63/817,154, filed on Jun. 3, 2025.

(51) Int. Cl.
*G06F 21/57* (2013.01)
*H04L 41/16* (2022.01)

(52) U.S. Cl.
CPC ........... *G06F 21/577* (2013.01); *H04L 41/16* (2013.01); *G06F 2221/033* (2013.01)

(58) Field of Classification Search
CPC ... G06F 21/577; G06F 2221/033; H04L 41/16
See application file for complete search history.

(56) References Cited

U.S. PATENT DOCUMENTS 9,594,912 B1 * 3/2017 Thioux ................. G06F 21/577
10,397,255 B1 * 8/2019 Bhalotra ............ H04L 63/1425
10,872,032 B1 * 12/2020 Russell ................. H04L 63/104
11,062,022 B1 * 7/2021 Kalamkar ........... G06F 9/45558
11,108,703 B1 * 8/2021 Kumar .................. H04L 47/827
12,248,434 B2 * 3/2025 Kotwal ............... G06F 16/1734
12,265,631 B1 * 4/2025 Singh .................... G06F 21/577
12,386,981 B1 * 8/2025 Hejderup ............. G06F 21/577
12,437,088 B2 * 10/2025 Wei ....................... G06F 21/604
12,511,404 B1 * 12/2025 Morello ................ G06F 21/577
12,554,676 B1 * 2/2026 Kammara .............. G06F 16/11
2008/0134319 A1 * 6/2008 Baker .................. G06F 21/629 726/21
2010/0257523 A1 * 10/2010 Frank ................. G06F 9/45558 718/1
2011/0214123 A1 * 9/2011 Lublin ............... G06F 9/45558 718/1
2011/0314445 A1 * 12/2011 Dutta ....................... G06F 8/74 717/109

(Continued)

*Primary Examiner* — Aravind K Moorthy
(74) *Attorney, Agent, or Firm* — Ashurst Perkins Coie US LLP

(57) ABSTRACT

AI-powered security analysis platforms with modular scanning architectures are disclosed herein. A system scans a codebase stored in a software repository to generate a scan snapshot. The system analyzes, using one or more code analyzers, the scan snapshot across corresponding security domains, where each code analyzer is associated with a different security domain and type of security vulnerability. The system identifies, using one or more large language models, a security vulnerability based on context of the software repository. The system determines, using a call graph, components through which the security vulnerability propagates. The system stores a timestamped record and compares it to a prior record. The system generates a corrective action and sends a report indicating the security vulnerability to the computer device.

20 Claims, 9 Drawing Sheets

(56) References Cited

U.S. PATENT DOCUMENTS

2015/0363294 A1* 12/2015 Carback, III ............. G06F 8/70 717/132
2016/0335555 A1* 11/2016 Llanes-Tosar ...... G06F 11/0778
2017/0147813 A1* 5/2017 McPherson ......... G06F 9/45558
2017/0235569 A1* 8/2017 Sturtevant .............. G06Q 40/12 717/102
2018/0248905 A1* 8/2018 Côté ................... H04L 63/1425
2019/0258807 A1* 8/2019 DiMaggio ............. G06F 21/577
2020/0104498 A1* 4/2020 Smith .................. G06N 3/0985
2020/0117588 A1* 4/2020 McBride ................... G06F 8/70
2020/0159926 A1* 5/2020 Lorch ................. H04L 63/1425
2020/0167155 A1* 5/2020 Lu ........................... G06F 8/437
2020/0304526 A1* 9/2020 Abraham .............. G06F 21/577
2020/0336465 A1* 10/2020 Mestery .............. H04L 63/0263
2021/0034413 A1* 2/2021 Ballantyne ................ G06F 8/71
2021/0044603 A1* 2/2021 Annen ................ H04L 63/1416
2021/0056211 A1* 2/2021 Olson ...................... G06N 5/01
2021/0112090 A1* 4/2021 Rivera ................ H04L 63/1425
2021/0117308 A1* 4/2021 Burgos ................ G06F 11/3624
2021/0133091 A1* 5/2021 Pillai ................... G06F 11/3604
2021/0248241 A1* 8/2021 Balkanski .............. G06V 20/95
2021/0286895 A1* 9/2021 Yang ..................... G06F 21/563
2021/0311786 A1* 10/2021 Tzortzatos ............ G06F 9/5011
2022/0046047 A1* 2/2022 Lewis ................... G06F 21/554
2022/0116783 A1* 4/2022 Goel ..................... H04W 64/00
2022/0131888 A1* 4/2022 Kanso ..................... H04L 63/20
2022/0156380 A1* 5/2022 Pradzynski ........... G06F 21/577
2022/0179964 A1* 6/2022 Qiao ..................... G06F 21/577
2022/0222350 A1* 7/2022 Franzen ................ G06F 11/321
2022/0269796 A1* 8/2022 Chase ................... G06F 21/577
2022/0283801 A1* 9/2022 Hoenzsch ............... G06F 21/54
2022/0292073 A1* 9/2022 MacIntosh .......... G06F 16/2358
2022/0391807 A1* 12/2022 Dubey ............. G06Q 10/06315
2022/0398188 A1* 12/2022 Leasck .................... G06F 9/451
2023/0004654 A1* 1/2023 Jurzak .................... G06N 20/20
2023/0054912 A1* 2/2023 Dixit J ................... G06V 30/19
2023/0094735 A1* 3/2023 Krasnov ................... G06F 8/71 726/23
2023/0205891 A1* 6/2023 Yellapragada ...... H04L 63/1416 726/25
2023/0208870 A1* 6/2023 Yellapragada .......... H04L 63/20 726/22
2023/0283521 A1* 9/2023 Berger .................... H04L 63/20 709/223
2023/0315421 A1* 10/2023 Picco .................. G06F 9/45558
2023/0344853 A1* 10/2023 Gallagher ........... H04L 63/1433
2024/0037226 A1* 2/2024 Lisowski .............. G06F 21/554
2024/0086190 A1* 3/2024 Kwatra ................. G06F 21/577
2024/0134996 A1* 4/2024 Madala ................. G06F 21/577
2024/0143777 A1* 5/2024 Kundu .................. G06F 21/577
2024/0152341 A1* 5/2024 Chappa ..................... G06F 8/63
2024/0248816 A1* 7/2024 Saraswat ............. G06F 9/45558
2024/0256659 A1* 8/2024 Hyder ................... G06F 21/566
2024/0273211 A1* 8/2024 Singh ..................... G06N 10/80
2024/0323226 A1* 9/2024 Pullen, III .......... G06F 21/6272
2025/0013464 A1* 1/2025 Singh .................. G06F 9/44505
2025/0028625 A1* 1/2025 Lawler ................ G06F 11/3608
2025/0036777 A1* 1/2025 Cameron .............. G06F 21/577
2025/0055869 A1* 2/2025 Barel .................. H04L 63/1433
2025/0068401 A1* 2/2025 Choudhari ................ G06F 8/34
2025/0130818 A1* 4/2025 Selvaraj .................... G06F 8/63
2025/0148072 A1* 5/2025 C M ....................... G06F 21/54
2025/0156163 A1* 5/2025 Nair ...................... G06F 8/4435
2025/0165315 A1* 5/2025 Kostyulin ........... H04L 63/1433
2025/0165617 A1* 5/2025 Cameron .............. G06F 21/577
2025/0181836 A1* 6/2025 Mehrotra .............. G06F 21/577
2025/0193149 A1* 6/2025 Woodworth ........ H04L 61/4511
2025/0209178 A1* 6/2025 Theismann ............. G06F 9/541
2025/0209179 A1* 6/2025 Theismann ........ G06Q 30/0185
2025/0217488 A1* 7/2025 Sundaravel ........... G06F 21/577
2025/0245341 A1* 7/2025 Malik ................... G06F 21/577
2025/0265055 A1* 8/2025 Xie .......................... G06F 8/433
2025/0265350 A1* 8/2025 Madiraju .............. G06F 21/577
2025/0298902 A1* 9/2025 Palanki ................. G06F 21/577
2025/0315251 A1* 10/2025 Beatty ....................... G06F 8/61
2025/0328652 A1* 10/2025 Vaezi .................... G06F 21/577
2025/0335336 A1* 10/2025 Pham .................... G06F 11/368
2025/0348594 A1* 11/2025 Yim ...................... G06F 21/577
2025/0362906 A1* 11/2025 Adhikari ................... G06F 8/76
2025/0371151 A1* 12/2025 Patel ..................... G06F 21/563
2026/0023857 A1* 1/2026 White ................... G06F 21/577
2026/0032143 A1* 1/2026 White ................. H04L 63/1433
2026/0037409 A1* 2/2026 Attar ......................... G06F 8/71
2026/0050690 A1* 2/2026 Patel ................... G06F 21/6263
2026/0086877 A1* 3/2026 Liu ..................... G06F 9/45558

* cited by examiner

```
diff -git a/README.md b/README.md
index 888c500..f0093e3 100644
--- a/README.md
+++ b/README.md
@@ -1,2 +1,3 @@
# Web Project
-This is the group website.
+This is the company homepage.
+
diff --git a/main.py b/main.py
index 777a123..e119a0b 100644
--- a/main.py
+++ b/main.py
@@ -10,3 +10,7 @@ def greet(name):
print (f"Hello, {name}!")

+def new_feature():
+ print("This is a new feature!")
+
+
if_name_ == "_main_":
greet("World")
```

AI-POWERED SECURITY ANALYSIS PLATFORM WITH MODULAR SCANNING ARCHITECTURE

CROSS-REFERENCE TO RELATED APPLICATION

This application claims the benefit of U.S. Provisional Patent Application No. 63/817,154, filed Jun. 3, 2025, the contents of which are incorporated herein by reference.

BACKGROUND

Providing application security can encompass a broad range of practices and technologies focused on identifying and mitigating vulnerabilities in software applications. This field can involve analyzing runtime configurations to detect potential security weaknesses that could be exploited by malicious actors. As software development practices have evolved, security analysis has become more common through the software development lifecycle, from initial design through deployment. Developers and security teams use various approaches including code reviews, static analysis, and dynamic testing during development and pre-release phases. Secure coding standards and analysis tools can help identify issues such as buffer overflows, input validation flaws, injection vulnerabilities, and insecure configurations early in the development process.

However, modern software codebases continue to grow in size and complexity, presenting challenges for maintaining comprehensive security oversight across components. The rapid pace of software development and the proliferation of interconnected systems can create unforeseen attack vectors that are difficult to anticipate during the development process. Security considerations often compete with other development priorities such as functionality, performance, and time-to-market pressures. Additionally, the emergence of new security threats and changing development methodologies requires security analysis approaches to continually adapt.

BRIEF DESCRIPTION OF THE DRAWINGS

Detailed descriptions of implementations of the present invention will be described and explained through the use of the accompanying drawings.

Figure 1:
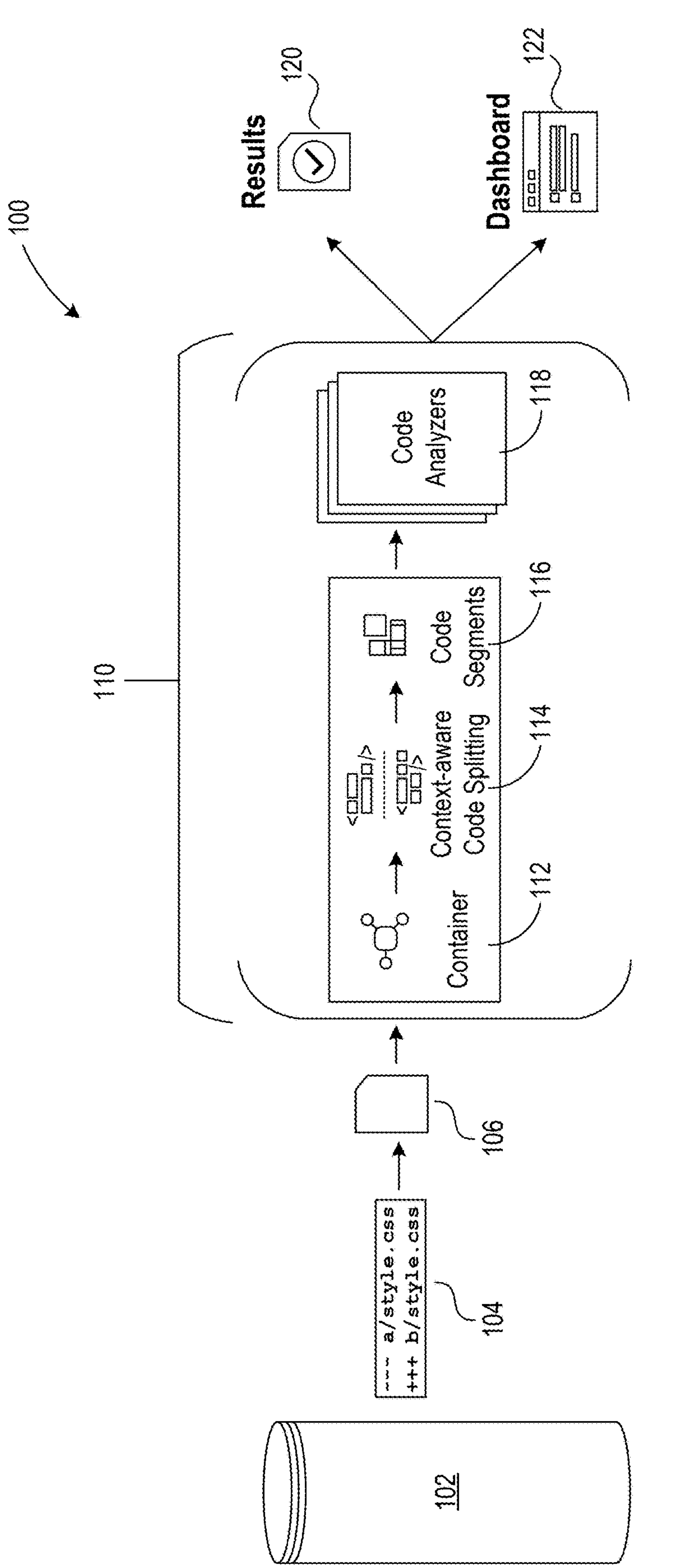
FIG. 1 is a drawing illustrating the components of a security analyzer platform in accordance with one or more embodiments of the disclosed technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Providing security in software development presents significant challenges due to the complex and dynamic nature of modern applications. Rapid changes in software technologies make it difficult to address new security vulnerabilities as they are discovered. The large number of interconnected systems can allow for unforeseen attack vectors that are difficult to consider during the development process. Security considerations also compete with other priorities such as functionality, performance, and time-to-market pressures. As codebases grow in size and complexity, maintaining a comprehensive understanding of security implications across components becomes increasingly difficult. Some existing security analysis techniques rely on pattern-matching approaches, such as regular expression matching, which can have limitations in understanding the context and semantics of code changes. These approaches can result in missed vulnerabilities or false positives, reducing their effectiveness for development teams seeking to identify genuine security concerns.

Some existing code analysis systems process proposed changes to codebases without fully considering the architectural and structural information of the code files, project-specific patterns, and relationships between different parts of the codebase. This lack of contextual awareness can limit the accuracy of security vulnerability detection. Additionally, some systems analyze code changes sequentially rather than in parallel, which can increase the time required to complete security assessments and delay the software development process. Furthermore, some existing approaches do not effectively leverage large language models (LLMs) to understand code semantics, which can limit their ability to detect complex vulnerabilities that require understanding of code behavior beyond simple pattern matching. The integration of natural language processing (NLP) capabilities into security analysis workflows remains an area where existing systems can fall short, particularly in generating human-readable explanations of detected vulnerabilities and providing actionable remediation suggestions to development teams.

The present disclosure describes techniques for artificial intelligence (AI)-powered security analysis platforms with modular scanning architectures that address limitations of existing security analysis approaches. In various embodiments, a system scans a codebase stored in a software repository to generate a scan snapshot and analyzes the scan snapshot using one or more code analyzers across corresponding security domains, where each code analyzer is associated with a different security domain and type of security vulnerability. The system can identify, using one or more LLMs, a security vulnerability based on a context of the software repository determined using the scan snapshot. The context can include application behaviors, underlying frameworks, component dependencies, and/or data storage patterns within the codebase. The system can determine, using a call graph generated based on function calls within the codebase, one or more components through which the security vulnerability propagates, providing visibility into how vulnerabilities can affect different parts of an application. The system can store timestamped records associated with scan snapshots, compare records to prior records to determine changes in security vulnerability status, and/or generate corrective actions based on detected changes. The modular scanning architecture can include specialized review modules that examine code patterns, dependency relationships, and execution pathways to detect security weaknesses across various programming languages and frameworks.

The disclosed technology provides several advantages over existing security analysis approaches. By leveraging LLMs to understand code semantics and context, the system can detect complex vulnerabilities that require understanding of code behavior beyond simple pattern matching, addressing limitations of pattern-matching techniques such as regular expression matching. The use of multiple code analyzers operating across different security domains enables parallel analysis of code, which can reduce the time required to complete security assessments compared to systems that analyze code changes sequentially. The call graph analysis provides visibility into how vulnerabilities can propagate through application components, enabling development teams to understand the scope of security concerns. The preservation of scan histories in timestamped format enables historical comparisons and trend analysis of security posture over time, allowing teams to track improvements and identify recurring issues. The generation of comprehensive reports detailing specific vulnerabilities, risk assessments, and recommended remediation steps provides development teams with actionable insights, addressing the challenge of generating human-readable explanations and remediation suggestions. The scan directory management allows teams to reuse and reference previously scanned data, providing continuity in security analysis across multiple development iterations and addressing the challenge of maintaining comprehensive security oversight as codebases grow in size and complexity.

The disclosed technology provides a practical application by improving the functioning of computer systems used in software development. The system analyzes code contexts, splits proposed changes into code segments, and uses multiple code analyzers in parallel to identify potential security issues. LLMs are used to understand the context and semantics of code changes more effectively, finding more vulnerabilities and avoiding more false positives than pattern-matching techniques such as regular expression matching. The disclosed technology therefore produces concrete, actionable security reports that enable developers to remediate vulnerabilities before deployment.

The disclosed technology provides an inventive step through its unconventional combination of elements. Multiple code analyzers analyze their corresponding code segments in parallel to detect potential security vulnerabilities. The system analyzes proposed changes based on code context representing architectural and structural information of code files, project-specific patterns, and/or relationships between different parts of the codebase. The integration of call graph analysis to track vulnerability propagation through components, combined with timestamped historical comparison for trend analysis, represents an ordered combination not found in conventional security tools.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Analyzer Framework

FIG. 1 is a drawing illustrating an example architecture of an analyzer platform 100 in accordance with one or more embodiments of the present technology. In some embodiments, the analyzer platform 100 first receives a change request 106, requested by one or more users of a codebase 102, that includes a proposed change 104 to codebase 102. Codebase 102 includes a collection of directories and files, where some files include text corresponding to one or more programming languages.

In some implementations, the codebase 102 is associated with metadata, including a name, a list of users, and a history of changes made by specific users. In some implementations, the codebase is a GitHub repository, with directories for source code, documentation, tests, and configuration files.

The proposed change 104 can include one or more changes made to one or more files in the codebase 102. In some cases, all code edits in the proposed changes are located in a single file. In some cases, the proposed change 104 includes edits to multiple files in the codebase 102. In some implementations, the proposed change 104 can be represented as a difference against the current codebase 102, such as being represented in the git diff format, which indicates changes to one or more files. In one example, the codebase 102 is a GitHub repository, and the change request 106 is a pull request, which contains the proposed change 104 to the codebase 102 and represents a proposal to merge a set of changes from one branch or version of code into another.

Figure 2:
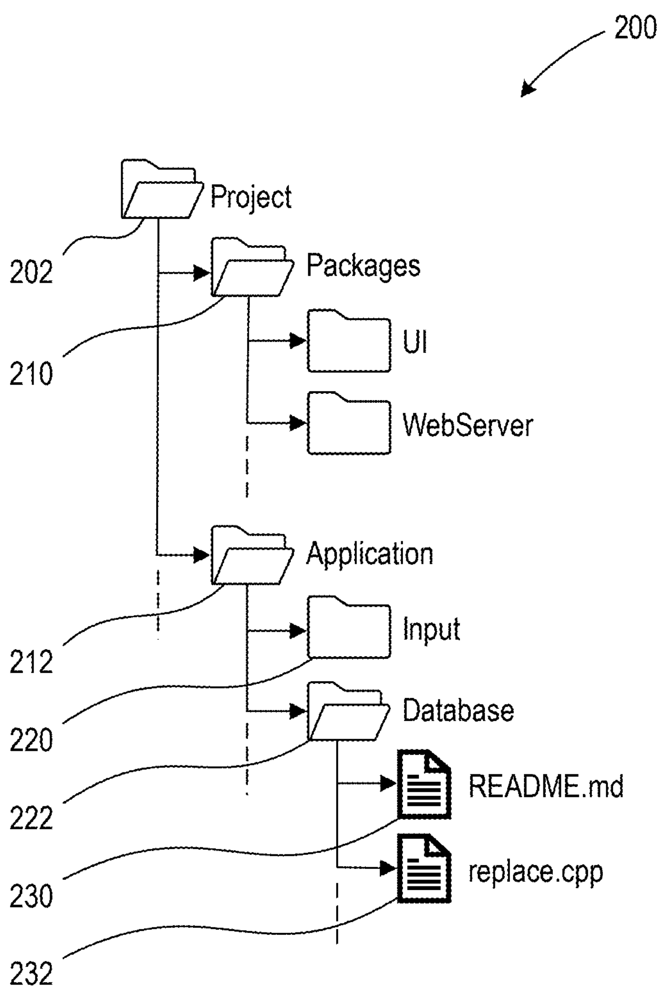
FIG. 2 is a drawing illustrating a codebase structure.

FIG. 2 is a drawing illustrating an example codebase 200 in accordance with one or more embodiments of the present technology. The codebase 200 includes a project directory 202 that serves as the main container or root directory for the project. Within the project directory 202, there can be directories 210, 212 and subdirectories 220, 222. Within the directories/subdirectories, there can be files 230, 232. Any directory in the codebase can contain subdirectories and/or files. Files can be of any format and contain any type of data. For example, file 230 can be a readme file that does not contain text corresponding to executable instructions. File 232 can be a code file, such as a C++ file, which contains text corresponding to executable instructions. The text files can include code written in one or more programming languages. Such files can contain a mixture of text that does and does not correspond to executable instructions. For example, a file containing code can also contain code comments or non-executable code, such as an unused function definition, which does not correspond to executable instructions. In some implementations, the directories and files can contain metadata such as a date of creation, a date of previous modification, an owner name, and/or the name of the last user to modify the contents of the directory or file.

Figure 3:
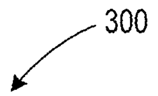
FIG. 3 is a drawing illustrating a format for a proposed change to a codebase.

FIG. 3 is a drawing illustrating an example git diff file showing the code changes. The git diff format 300 for proposed change uses a notation to indicate additions, deletions, and the location of changes within files. This allows changes to the codebase 102 to be represented in a text file. The proposed change 104 can also include text that does not change, such as text above or below a portion of changed text, and can include all text from a changed file. Furthermore, the proposed change 104 can include metadata about the changes, including information about a user who requested the change request 106, information about users who contributed to the proposed change 104, and comments included with the change request 106. The proposed change 104 can also contain the text of other files in the codebase in order to provide context to the code change, such as including code dependencies.

Upon receiving the proposed change 104, the analyzer platform 100 processes the proposed change using a code analyzer framework 110. The code analyzer framework 110 processes the data and metadata of a change request 106 for analysis by one or more code analyzers 118. The code analyzer framework 110 can be implemented inside one or more containers 112 (e.g., ephemeral containers in Kubernetes) for troubleshooting. A container 112 is an isolated software environment configured to execute code pertaining to the code analyzer framework 110.

Upon receiving the proposed change 104, the code analyzer framework 110 determines a code context 114 for the proposed change 104 based on the codebase 102. As explained above, the code context represents architectural and/or structural information of the files, project-specific patterns, and/or relationships between different parts of the codebase 102. In some cases, known security vulnerabilities can be applicable to one or more specific code contexts. Information that can be used to determine the code context includes file data, file metadata, file paths, and/or user data. Examples of information in a code context can include a file type, programming language, dependencies used (e.g., frameworks, modules, libraries), environment (e.g., frontend, backend), and details of the users creating or requesting the proposed changes (e.g., past behavior, edit frequency, security credentials). The context of the codebase 102 can include information pertaining to all files of the codebase 102 or can include information pertaining to only a portion of the codebase 102. The code context 114 for the proposed change 104 includes aspects of the context of the codebase 102 that pertain to the proposed change 104.

Once a code context 114 has been determined for a proposed change 104, the code context 114 is used to split the proposed change 104 into code segments 116. This can be performed by the code analyzer framework 110 or by one or more code analyzers 118. A code analyzer 118 is a software program designed to process the proposed change 104 to a codebase 102 and the code context 114 of the proposed change 104 to determine if a security vulnerability exists in the proposed change 104. Each code analyzer 118 can be associated with a corresponding aspect of security concerns, including but not limited to SQL injection, buffer overflow, cross-site scripting, and authentication validation. In some implementations, a code analyzer framework 110 and/or one or more code analyzers 118 process the proposed change 104 and the code context 114 to generate code segments 116. In some implementations, each code analyzer 118 generates code segments 116 corresponding to an aspect of security concerns associated with the code analyzer 118. The one or more code analyzers 118 analyze their corresponding code segments 116 in parallel with other code analyzers 118 to detect potential security vulnerabilities in the proposed change 104. In some implementations, a plurality of code analyzers 118 associated with the same code analyzer framework 110 execute in parallel.

Figure 4:
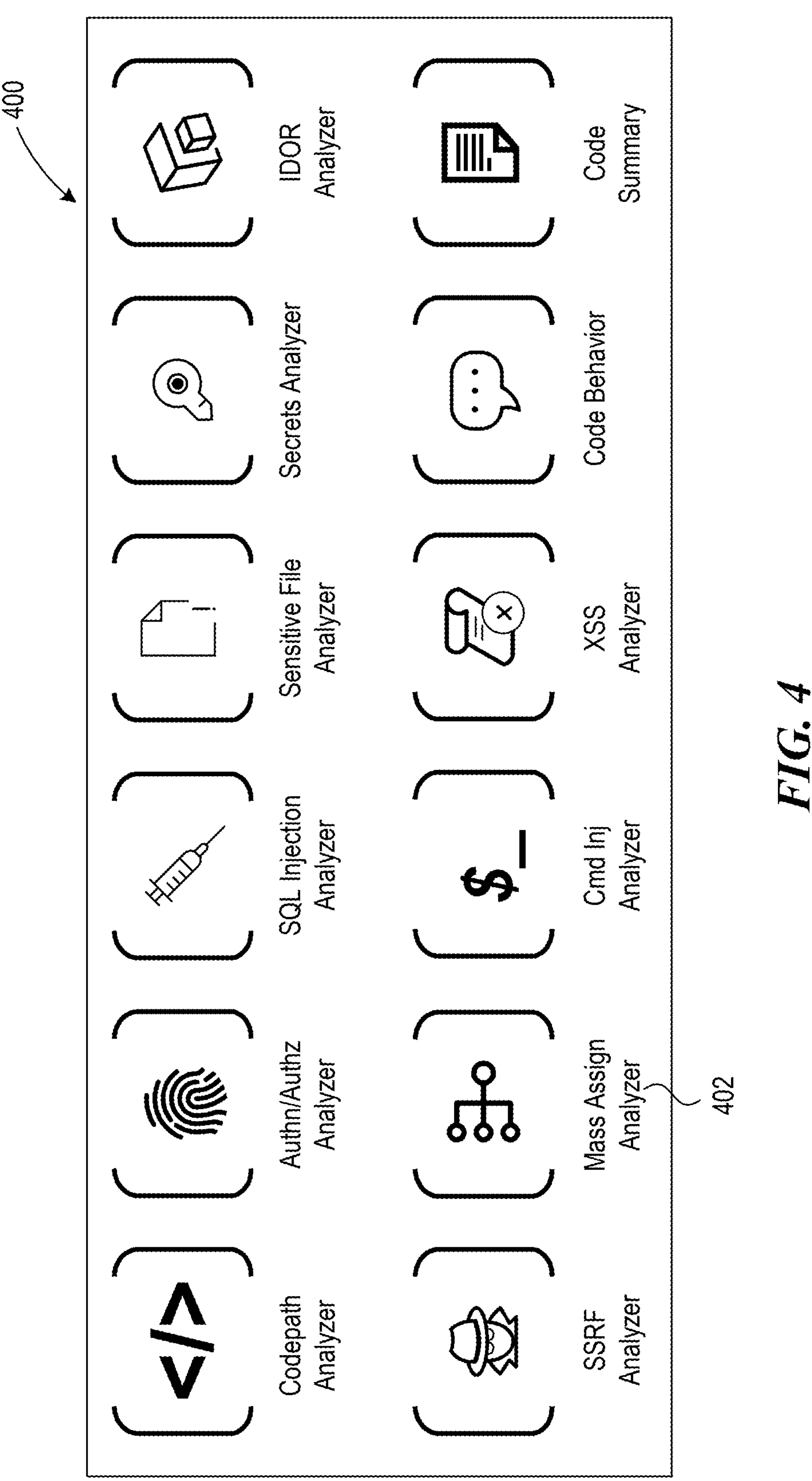
FIG. 4 is a drawing illustrating example code analyzers and corresponding security aspects in accordance with some embodiments of the disclosed technology.

FIG. 4 is a drawing illustrating a list 400 of example code analyzers 402 under a code analyzer framework. The example code analyzers 402 include analyzers for code paths, authentication/authorization, SQL injection, sensitive files, GitHub secrets, insecure direct object references (IDOR), server-side request forgery (SSRF), mass assignment, command injection, cross-site scripting (XSS), code behavior, and code summarization.

Figure 8:
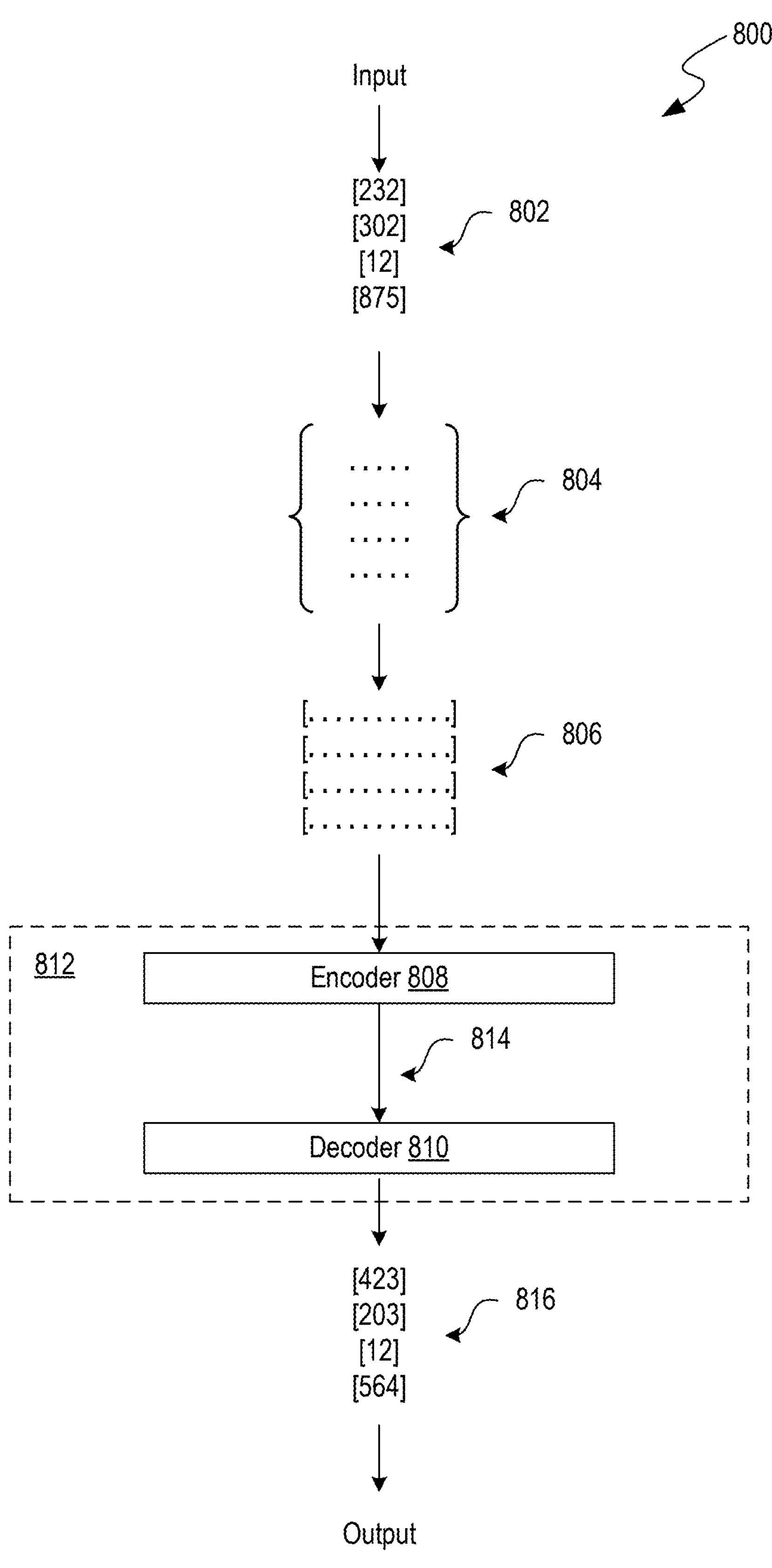
FIG. 8 is a drawing that illustrates an example process performed by a transformer in accordance with various embodiments of the present technology.

In some implementations, artificial intelligence (AI) models are used. Examples of AI models include LLMs, such as schematically depicted in FIG. 8. In some implementations, one or more code analyzers 118 use one or more LLMs to process code context 114, code segments 116, and one or more prompts in order to detect a security vulnerability. An LLM can be used to understand the context and semantics of code changes more effectively, finding more vulnerabilities and avoiding more false positives than other pattern-matching techniques, such as regular expression (e.g., RegEx) matching. These models can additionally generate natural-language explanations of detected vulnerabilities and/or provide suggestions for code improvements. In some embodiments, LLMs can be used to process natural language security questions, allowing for more flexible and more easily understood security policies. The integration of AI models enables a system to quickly adapt to new security threats and coding practices over time without the need to manually enter new patterns corresponding to these new threats, improving the accuracy and efficiency of the security analysis process.

The code analyzers 118 produce one or more security analysis reports 120. A security analysis report 120 can include information such as the name of one or more code analyzer(s) 118 used to produce the report, the corresponding security aspect(s) of the one or more analyzer(s), detected security vulnerabilities, risk level or urgency level associated with each detected security vulnerability, and/or a time taken for an analyzer to detect a security vulnerability. The content of the security analysis reports 120 can be displayed on a dashboard user interface 122. The dashboard user interface 122 can present a security analysis summary, including the information contained in one or more security analysis reports 120. In some implementations, the dashboard user interface 122 includes security analysis summaries associated with one or more change requests 106 corresponding to one or more proposed changes 104 to one or more codebases 102.

Security Analysis Platform with Modular Scanning Architecture

Figure 5:
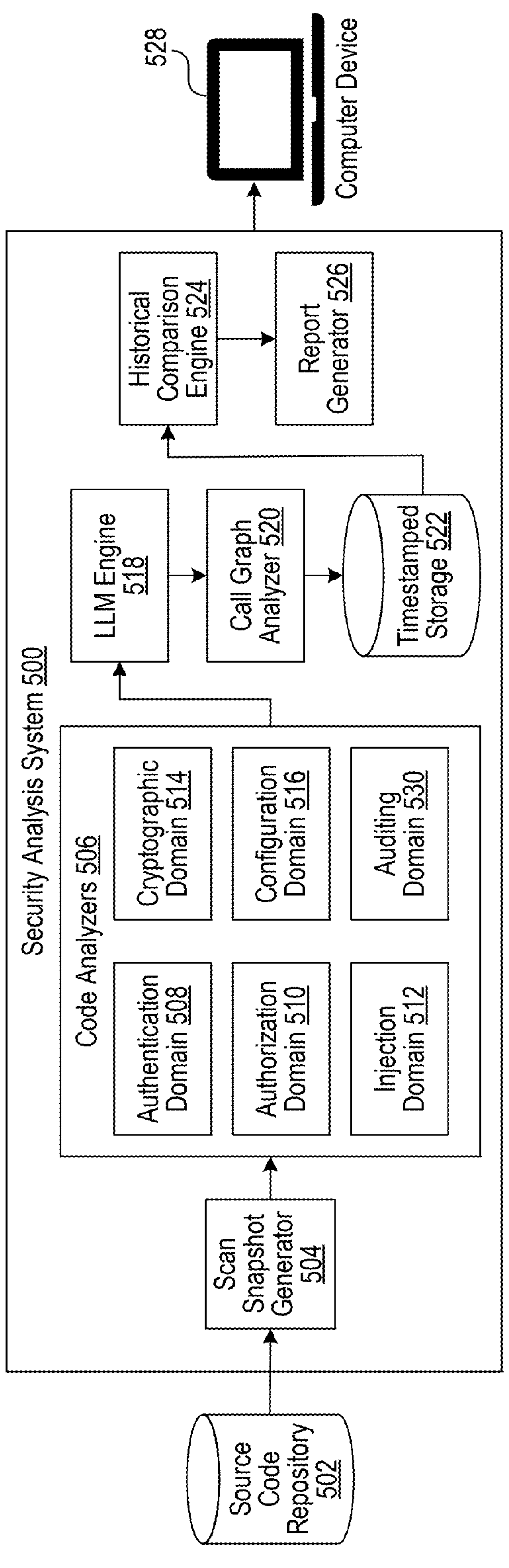
FIG. 5 is a block diagram that illustrates an example system that can implement aspects of the present technology.

FIG. 5 is a block diagram that illustrates an example system 500 that can implement aspects of the present technology. The system 500 can be a security analysis system. The system 500 includes a scan snapshot generator 504, code analyzers 506, an LLM engine 518, a call graph analyzer 520, a timestamped storage 522, a historical comparison engine 524, and a report generator 526. The code analyzers 506 include an authentication domain analyzer 508, an authorization domain analyzer 510, an injection domain analyzer 512, a cryptographic domain analyzer 514, a configuration domain analyzer 516, and an auditing domain analyzer 530. The system 500 is configured to perform comprehensive scanning and assessment of software repositories to identify security vulnerabilities using LLMs and modular analysis components. System 500 is implemented using components of the example computer system 900 illustrated and described in more detail with reference to FIG. 9.

The software repository 502 (sometimes referred to as a source code repository) stores a codebase to be analyzed. The codebase can include a collection of directories and/or files, where some files include text written in one or more programming languages. The software repository 502 can be a version control system that maintains code files, documentation, tests, and configuration files. The software repository 502 can be a cloud-based repository such as GitHub, GitLab, or Bitbucket or an enterprise repository such as Azure DevOps, AWS CodeCommit, or Perforce. The software repository 502 can also be a self-hosted repository using systems such as Subversion, Mercurial, or a self-hosted GitLab instance. The software repository 502 is connected to the scan snapshot generator 504, which scans the codebase stored in the software repository 502 to generate a scan snapshot representing a current state of the codebase for analysis. The scan snapshot can include file data, file metadata, and/or file paths associated with the codebase. The scan snapshot generator 504 can validate that the software repository 502 exists and is accessible before scanning operations begin.

After the scan snapshot generator 504 scans the codebase to generate a scan snapshot representing a current state of the codebase, the system 500 performs context gathering about the application. Context gathering can include monorepo detection, behavior overview including business purpose, target audience, data handling, and user roles, as well as tech stack analysis including programming language, development framework, architecture pattern, build and deployment configurations, components and libraries, datastore, authentication patterns, authorization patterns, and routes or routing that define the attack surface. In some implementations, the system 500 interrogates the code to build out knowledge of what is going on in the system, which feeds into the planning phase that determines which analyzers and which sub-agents actually get called.

As code is received, the system 500 determines characteristics of the code, such as whether the code accepts user input or includes an authorization function. This approach allows the system 500 to identify areas where security risks can exist. If the code does not satisfy conditions at high branch nodes of a decision tree, the corresponding section can be excluded from analysis because the code does not interact with authentication mechanisms, login functionality, or user input handling. Security risks can be added to or removed from the analysis based on the determined characteristics of the code change or code section. The primary phases of analysis can include context gathering, review planning, review execution, and deduplication, cleanup, and false positive elimination. Review planning is performed by the code analyzers 506, where the review planning uses the gathered context to remove or add review items in the security domains including authentication, authorization, and cryptography.

The code analyzers 506 use the gathered context to investigate the categories or domains of vulnerabilities. The system 500 can maintain a pre-configured review plan and modify the review plan based on the context gathered about an application by removing or adding items in each of the domains including the authentication domain, the authorization domain, the injection domain, the cryptographic domain, the configuration domain, and the auditing domain.

The LLM engine 518 can process the scan snapshot using the gathered context to identify security vulnerabilities associated with the relevant security domains. This approach improves accuracy and relevance of the security analysis, reduces false positives, and reduces computational costs by analyzing only the portions of the codebase that are relevant to the identified security domains.

The code analyzers 506 analyze the scan snapshot across multiple security domains. A security domain is a category of security concerns associated with a particular type of vulnerability or attack vector. Each of the code analyzers 506 is associated with a different security domain, and each security domain is associated with a different type of security vulnerability. The authentication domain analyzer 508 is configured to detect security vulnerabilities related to authentication mechanisms, such as insecure password handling and/or weak authentication protocols. The authorization domain analyzer 510 is configured to detect security vulnerabilities related to authorization controls, such as improper access control and/or privilege escalation vulnerabilities. The injection domain analyzer 512 is configured to detect code injection vulnerabilities, such as SQL injection, command injection, and/or XSS vulnerabilities. The cryptographic domain analyzer 514 is configured to detect security vulnerabilities related to cryptographic implementations, such as use of weak encryption algorithms or hardcoded encryption keys. The configuration domain analyzer 516 is configured to detect security vulnerabilities related to configuration management, such as insecure configurations or exposed sensitive files. The auditing domain analyzer 530 is configured to detect security vulnerabilities related to logging and auditing implementations within the codebase. For example, the auditing domain analyzer 530 can identify flaws such as insufficient logging for incident response, improper audit trails that prevent tracing which user performed which action to determine where an exploit started, and logging of sensitive information such as passwords in plain text.

The code analyzers 506 can include analyzers for code paths, authentication/authorization, SQL injection, sensitive files, GitHub secrets, IDOR, SSRF, mass assignment, command injection, XSS, code behavior, and/or code summarization. The code analyzers 506 analyze the scan snapshot based on code patterns, dependency relationships, and/or execution pathways. Code patterns are recurring code structures associated with security vulnerabilities, such as functions that accept user input, authentication mechanisms, and/or cryptographic implementations. Dependency relationships are connections between code components and external resources, such as frameworks, libraries, and/or packages used by one or more files of the codebase. Execution pathways are sequences of function calls and control flow paths through the codebase, such as paths from user input to database queries.

Each code analyzer can generate a security analysis report that includes information such as the name of the code analyzer used, the corresponding security aspects, detected security vulnerabilities, risk level and/or urgency level associated with each detected security vulnerability, and/or time taken for the analyzer to execute and detect a security vulnerability. The LLM engine 518 uses one or more LLMs to identify security vulnerabilities based on a context of the software repository 502 determined using the scan snapshot. The LLM engine 518 is implemented using the elements illustrated and described in more detail with reference to FIG. 8.

The context can include an application behavior of the codebase, a framework used by the codebase, a component dependency within the codebase, and/or a data storage pattern of the codebase. The context represents information about the codebase that informs security vulnerability detection. Application behaviors are functional characteristics of the codebase, such as whether the application accepts user input, processes authentication requests, or operates as a frontend or backend service. Frameworks are software development platforms that provide structure and functionality, such as Django, Ruby on Rails, React, or Spring. Component dependencies are external resources used by the codebase, such as libraries, modules, and packages. Data storage patterns are methods by which the codebase stores and retrieves data, such as database queries, file system operations, or caching mechanisms.

The context can further include information pertaining to file type, programming language, dependencies used (such as frameworks, modules, and/or libraries), environment (such as frontend or backend), and/or details of users creating or requesting proposed changes (such as past behavior, edit frequency, and/or security credentials). The LLM engine 518 processes the scan snapshot using NLP to identify security vulnerabilities associated with one of the security domains. NLP is a branch of AI that enables computers to understand, interpret, and generate human language. The LLM engine 518 can use NLP techniques to analyze code semantics, interpret code comments and documentation, generate human-readable explanations of detected vulnerabilities, and provide actionable remediation suggestions to development teams.

The LLM engine 518 can use an incremental inquiry chain to achieve deterministic outputs from the LLMs. The incremental inquiry chain involves breaking down a complex query into a series of smaller, more specific questions or prompts designed to elicit short, specific responses from the LLMs. For example, instead of prompting an LLM with a broad question such as "does this code include an SQL injection vulnerability?", the incremental inquiry chain prompts the LLM with simpler questions asked in sequence, such as "is there a function present?", "does the present function accept a string?", and "is the string associated with user input?", eventually leading to a final output. Each prompt in the chain requires less context and analysis and restricts the possible outputs to short sentences or Boolean values, increasing the likelihood of the LLM generating the same final output when given the same initial input.

The LLM engine 518 can use a multi-pass inquiry method where data, such as a code segment and a code context, are repeatedly reviewed using a series of incremental inquiries. The LLM engine 518 can use retrieval-augmented generation in which the code analyzers 506 search external databases, such as a knowledge database or website, for information that is then incorporated into the LLM(s). The LLM engine 518 can process natural-language security questions supplied by a user that are processed by a code analyzer to detect the existence of a security vulnerability. A code policy can include a natural-language security question and one or more actions to be taken in response to a detection of a security vulnerability related to the natural-language security question.

The LLM engine 518 can supply the LLM(s) with one or more few-shot prompting examples based at least in part on the code context. The prompts to the LLM(s) can include zero-shot prompts with no examples, one-shot prompts with one example, or few-shot prompts with multiple examples of the desired output. The LLM used can be a transformer-based model that includes an encoder that encodes embeddings into feature vectors representing latent features and a decoder that maps feature vectors into meaningful output. The LLM engine 518 can use Generative Pre-trained Transformer (GPT)-type language models such as GPT-3 or ChatGPT that have been trained on large corpora and have hundreds of billions of learned parameters. The LLM engine 518 can access a remote language model via a software interface, such as an application programming interface (API), or via a network such as the Internet, including cloud-based language models.

The call graph analyzer 520 generates a call graph based on function calls within the codebase and determines one or more components of the codebase through which security vulnerabilities propagate. The call graph includes execution pathways between functions in the codebase. Execution pathways are sequences of function calls that trace how data and control flow through the codebase, such as a path from a user input function to a database query function.

The components can include functions, classes, or modules within the codebase. Functions are reusable blocks of code that perform specific tasks, such as a function that validates user credentials or processes payment information. Classes are object-oriented programming constructs that encapsulate data and behavior, such as a user class that manages user authentication or a transaction class that handles financial operations. Modules are self-contained units of code that group related functions and classes, such as an authentication module or a database access module. The call graph analyzer 520 provides visibility into how vulnerabilities can affect different parts of an application by tracking the relationships between functions and identifying paths through which malicious inputs or vulnerable code patterns can propagate.

The timestamped storage 522 stores timestamped records associated with scan snapshots. Each timestamped record indicates detected security vulnerabilities and the one or more components through which the security vulnerabilities propagate. The timestamped records enable preservation of scan histories in a structured format. The timestamped records are data entries that associate scan results with a specific point in time, such as a record indicating that an SQL injection vulnerability was detected on a particular date. Scan histories are chronological collections of scan results that track security analysis over time, enabling comparison of security posture across multiple scans. The structured format facilitates storage and retrieval, such as JSON, XML, or database records. The timestamped records can indicate a severity level associated with each security vulnerability. The severity level is a classification indicating the potential impact of a security vulnerability, such as critical, high, medium, or low, where critical vulnerabilities may allow unauthorized system access and low vulnerabilities may have minimal security impact.

The historical comparison engine 524 compares timestamped records to prior timestamped records associated with prior scan snapshots of the software repository 502 to determine changes in status of security vulnerabilities. The change in status can be based on presence or absence of a security vulnerability in the prior timestamped record. A change in status can indicate that a security vulnerability is newly introduced, remediated, or modified. A newly introduced status indicates that a security vulnerability is present in the current scan snapshot but absent from the prior scan snapshot, such as when a developer adds code containing an SQL injection vulnerability. A remediated status indicates that a security vulnerability is present in the prior scan snapshot but absent from the current scan snapshot, such as when a developer fixes an authentication bypass vulnerability.

A modified status indicates that a security vulnerability is present in both the current and prior scan snapshots but has changed in scope, such as when a vulnerability propagates to additional components or is partially addressed. The change in status can indicate a difference between the one or more components indicated in the timestamped record and one or more components indicated in the prior timestamped record. In some implementations, the historical comparison engine 524 determines that a particular security vulnerability is indicated in a prior timestamped record. The system 500 determines using the LLM(s) that the particular security vulnerability is absent from the scan snapshot and updates the timestamped record to indicate a change in status (remediated) of the particular security vulnerability based on determining that the particular security vulnerability is absent from the scan snapshot.

The historical comparison engine 524 enables trend analysis of security posture over time by determining trends in a number of security vulnerabilities detected in the software repository 502 over time, a number of components of the codebase affected by security vulnerabilities over time, changes in statuses of security vulnerabilities over time, or security vulnerabilities detected across the security domains over time. A trend in a number of security vulnerabilities indicates whether the total count of detected vulnerabilities is increasing, decreasing, or remaining stable, such as a trend showing that SQL injection vulnerabilities decreased from fifteen to five over a six-month period. A trend in a number of components affected by security vulnerabilities indicates whether vulnerabilities are spreading to or being eliminated from portions of the codebase, such as a trend showing that authentication vulnerabilities initially affected three modules but now affect seven modules. A trend in changes in statuses of security vulnerabilities indicates patterns in how vulnerabilities are introduced and remediated, such as a trend showing that newly introduced vulnerabilities are being remediated within an average of two weeks. A trend in security vulnerabilities detected across security domains indicates the distribution of vulnerabilities among different security categories, such as a trend showing that injection vulnerabilities are decreasing while configuration vulnerabilities are increasing.

The report generator 526 can generate reports based on changes in status of security vulnerabilities. The report generator 526 can generate a corrective action for the security vulnerability. A corrective action is a recommended step or modification to address a detected security vulnerability. Corrective actions can include code modifications, such as replacing a vulnerable function with a secure alternative or adding input validation to prevent SQL injection. Corrective actions can include configuration changes, such as updating encryption settings or disabling insecure protocols. Corrective actions can include dependency updates, such as upgrading a library to a version that patches a known vulnerability. Corrective actions can include access control adjustments, such as implementing proper authorization checks or restricting file permissions.

The reports can detail specific vulnerabilities, risk assessments, and recommended remediation steps. The reports can be formatted using markdown syntax. Markdown syntax is a lightweight markup language that uses plain text formatting conventions to create structured documents. Markdown syntax can include headings denoted by hash symbols, such as "Critical Vulnerabilities" for a top-level heading or "SQL Injection" for a subheading. Markdown syntax can include bullet points denoted by asterisks or hyphens, such as "—Affected file: auth.py" for listing affected components. Markdown syntax can include code blocks denoted by backticks, such as "sanitize_input( )" for inline code references or triple backticks for multi-line code examples. Markdown syntax can include emphasis formatting, such as bold text denoted by double asterisks for highlighting critical information or italic text denoted by single asterisks for additional context.

The report generator 526 sends reports indicating the corrective actions to the computer device 528. The computer device 528 receives reports from the report generator 526 and allows development teams to view security analysis results and prioritize security improvements. The scan snapshot can be stored in a scan directory for reuse of the scan snapshot across multiple versions of the codebase, providing continuity in security analysis across multiple development iterations. In some implementations, the scan directory stores scan snapshots indexed by version identifiers, such as commit hashes or release tags, enabling retrieval of scan results associated with specific versions of the codebase. The scan directory can store baseline scan snapshots that serve as reference points for comparing subsequent scans, such as a baseline established after a security audit or prior to a major release. In some implementations, the scan directory enables incremental scanning by storing previously analyzed portions of the codebase, allowing subsequent scans to focus on changed files rather than reanalyzing the entire codebase. The scan directory can maintain a cache of parsed code structures, dependency graphs, and call graphs that can be reused across scans to reduce processing time. In some implementations, the scan directory stores scan snapshots across multiple branches of the codebase, enabling security comparison between development branches, feature branches, and production branches.

Figure 6:
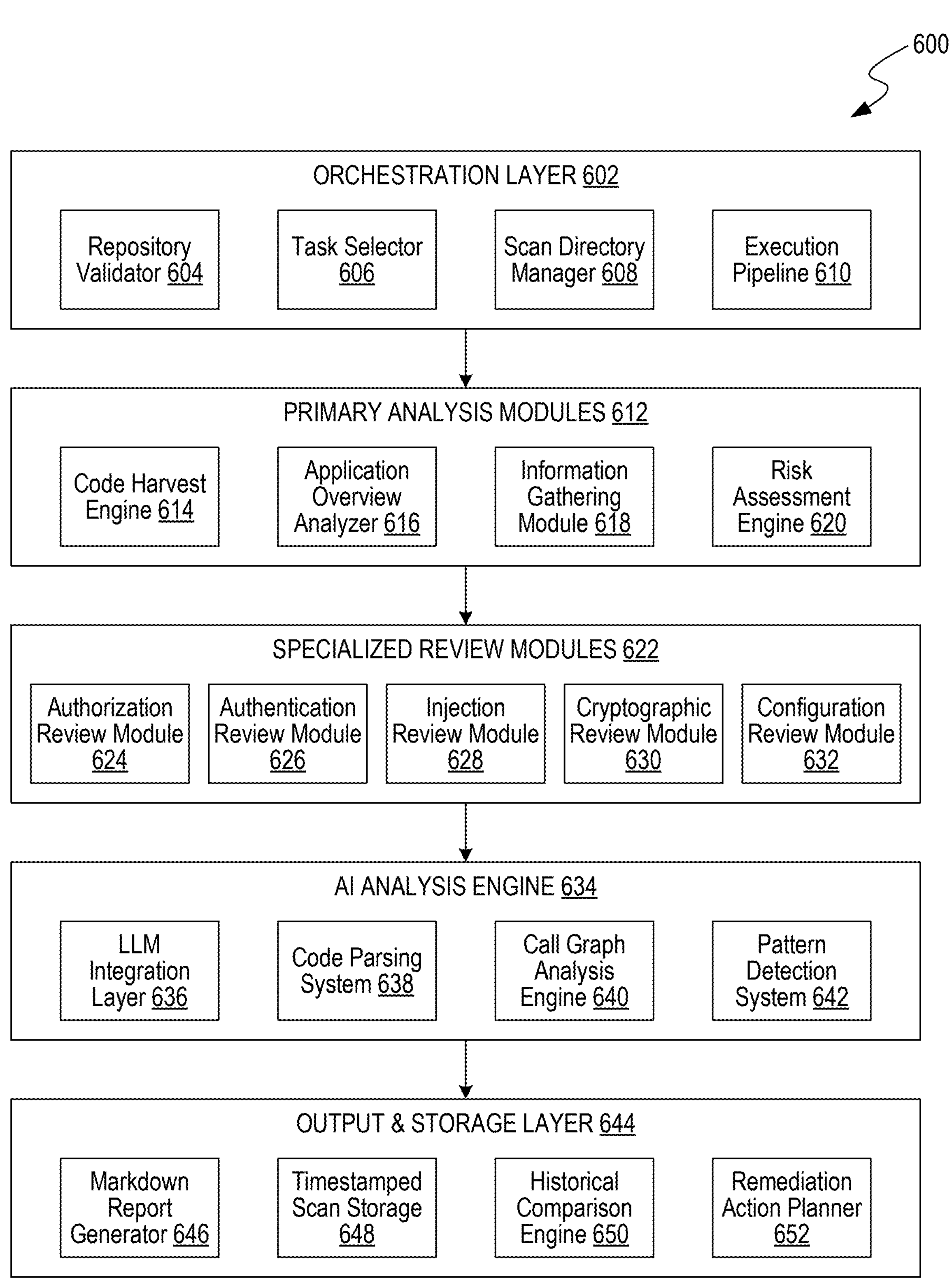
FIG. 6 is a block diagram that illustrates an example system with a modular scanning architecture for AI-powered security analysis in accordance with one or more embodiments of the present technology.

FIG. 6 is a block diagram that illustrates an example system 600 with a modular scanning architecture for AI-powered security analysis in accordance with one or more embodiments of the present technology. The system 600 includes an orchestration layer 602, primary analysis modules 612, specialized review modules 622, an AI analysis engine 634, and an output and storage layer 644. The system 600 can scan a codebase stored in a software repository to generate a scan snapshot of the software repository and analyze the scan snapshot using one or more code analyzers across corresponding security domains. The system 600 can identify security vulnerabilities using one or more LLMs and determine components through which security vulnerabilities propagate using a call graph. The system 600 can store timestamped records and compare records to determine changes in status of security vulnerabilities. The system 600 can be implemented using the example computer system 900 illustrated and described in more detail with reference to FIG. 9.

The orchestration layer 602 manages an overall workflow of the security analysis process. The orchestration layer 602 includes a repository validator 604 configured to verify that a software repository exists and is accessible before scanning operations begin. The repository validator 604 can verify that the software repository exists by sending an HTTP request to a repository API endpoint and confirming a successful response code. The repository validator 604 can verify that the software repository is accessible by authenticating with the repository using access credentials, such as API tokens, SSH keys, or OAuth tokens. The repository validator 604 can validate that the software repository is a GitHub repository or another version control system that maintains code files, documentation, tests, and configuration files.

The orchestration layer 602 includes a task selector 606 that determines which analysis tasks to perform based on characteristics of the codebase being analyzed. The task selector 606 can select analysis tasks based on file types, programming languages, dependencies used (such as frameworks, modules, and libraries), and environment (such as frontend or backend). Analysis tasks can include code path analysis, authentication review, authorization review, SQL injection detection, cryptographic implementation review, configuration assessment, sensitive file detection, and dependency vulnerability scanning.

The orchestration layer 602 includes a scan directory manager 608 that allows teams to reuse and reference previously scanned data, providing continuity in security analysis across multiple development iterations. In some implementations, the scan directory manager 608 stores the scan snapshot in a scan directory for reuse of the scan snapshot across multiple versions of the codebase. The scan directory manager 608 can enable reuse of the scan snapshot for incremental scanning, where subsequent scans analyze only changed portions of the codebase rather than reanalyzing the entire codebase. In some implementations, the scan directory manager 608 enables reuse of the scan snapshot for baseline comparisons, where current scan results are compared against a previously stored baseline to identify newly introduced vulnerabilities. The scan directory manager 608 can enable reuse of the scan snapshot for regression testing, where scan results are compared before and after code changes to verify that remediated vulnerabilities have not been reintroduced.

The orchestration layer 602 includes an execution pipeline 610 that coordinates the flow of data and operations through the various analysis stages. The execution pipeline 610 can be implemented inside of one or more containers for troubleshooting, such as ephemeral containers in Kubernetes. The proposed change can be represented as a difference against the current codebase, such as being represented in the git diff format, which indicates changes to one or more files. The codebase can be a GitHub repository, and a change request can be a pull request, which contains the proposed change to the codebase and represents a proposal to merge a set of changes from one branch or version of code into another.

The primary analysis modules 612 perform initial assessment of the codebase. The primary analysis modules 612 include a code harvest engine 614 configured to extract and collect code from the software repository for analysis. The code harvest engine 614 can extract file data, file metadata, and/or file paths associated with the codebase. The code context can include metadata such as date of creation, date of previous modification, owner name, and/or the name of the last user to modify the contents of the directory or file. The primary analysis modules 612 include an application overview analyzer 616 that examines the overall structure and characteristics of the application. The application overview analyzer 616 can determine an application type of the codebase based on file types, programming languages, code dependencies, and/or characteristics of users making changes.

The primary analysis modules 612 include an information gathering module 618 that collects relevant data about the codebase including dependencies, frameworks, and configuration details. The information gathering module 618 can identify code dependencies that include frameworks (such as Django or Ruby on Rails), libraries, and/or packages used by one or more files of the codebase. The primary analysis modules 612 include a risk assessment engine 620 that evaluates potential security risks associated with the codebase based on the gathered information. The risk assessment engine 620 can determine that a portion of text has a higher risk of containing a security vulnerability based at least in part on a characteristic of the user who proposed the change, such as the user having a low number of confirmed changes or not having passed a security training program.

The specialized review modules 622 can be used to analyze specific security domains. For example, the specialized review modules 622 include an authorization review module 624 configured to detect security vulnerabilities related to authorization controls, such as improper access control, privilege escalation vulnerabilities, and/or IDOR. The specialized review modules 622 include an authentication review module 626 configured to detect security vulnerabilities related to authentication mechanisms, such as insecure password handling, weak authentication protocols, and GitHub secrets exposure. The specialized review modules 622 include an injection review module 628 configured to detect code injection vulnerabilities such as SQL injection, command injection, and/or SSRF.

The specialized review modules 622 include a cryptographic review module 630 configured to detect security vulnerabilities related to cryptographic implementations, such as use of weak encryption algorithms, hardcoded encryption keys, and insecure cryptographic configurations. Weak encryption algorithms can include deprecated algorithms such as MD5, SHA-1, DES, or RC4 that are susceptible to known attacks. Hardcoded encryption keys can include API keys, passwords, or cryptographic secrets embedded directly in source code rather than stored in secure configuration files or environment variables. Insecure cryptographic configurations can include use of insufficient key lengths, such as RSA keys shorter than 2,048 bits, use of insecure cipher modes such as ECB mode, or improper initialization vector generation that reduces encryption strength.

The specialized review modules 622 include a configuration review module 632 configured to detect security vulnerabilities related to configuration management, such as insecure configurations, exposed sensitive files, and mass assignment vulnerabilities. The configuration review module 632 can analyze the scan snapshot based on code patterns, dependency relationships, and execution pathways in the scan snapshot. Each specialized review module is associated with a different security domain and is configured to detect security vulnerabilities associated with its corresponding domain.

The specialized review modules 622 can include an auditing review module configured to detect security vulnerabilities related to logging and auditing implementations within the codebase. The auditing review module can evaluate how well the codebase uses auditing functions, which is important for incident response where development teams need to trace which user performed which action to determine where an exploit started. The auditing review module can identify flaws such as insufficient logging, improper audit trails, and logging of sensitive information including passwords in plain text.

The AI analysis engine 634 leverages AI capabilities for security analysis. The AI analysis engine 634 includes an LLM integration layer 636 that interfaces with one or more LLMs to identify security vulnerabilities based on context of the software repository. The one or more LLMs can process the scan snapshot using NLP to identify a security vulnerability. The security vulnerability is identified based on a context of the software repository determined using the scan snapshot, and each security vulnerability is associated with a security domain. The context can include an application behavior of the codebase, a framework used by the codebase, a component dependency within the codebase, and a data storage pattern of the codebase. Each security vulnerability is associated with a security domain that categorizes the type of vulnerability. For example, SQL injection vulnerabilities are associated with the code injection domain, weak password handling is associated with the authentication domain, and improper access controls are associated with the authorization domain.

The AI analysis engine 634 includes a code parsing system 638 that processes and parses source code for analysis by the LLMs. The code parsing system 638 can split proposed changes into code segments based on code context, where each code segment contains code that can be analyzed as a unit, such as a function or class. The code segments can be anonymized by removing data and metadata such that the original source of the code segment cannot be identified and stored in a repository for later use. The AI analysis engine 634 includes a call graph analysis engine 640 that generates call graphs based on function calls within the codebase and determines one or more components through which security vulnerabilities propagate. For example, security vulnerabilities can propagate through components such as a user input function that passes unsanitized data to a database query function, an authentication module that shares credentials with multiple service classes, or a utility library used by several application modules. The call graph is generated based on function calls in the codebase. Function calls can include a login function calling a password validation function, a payment processing function calling a database query function, or an API handler calling an authentication verification function. The one or more components can include functions, classes, or modules within the codebase.

The AI analysis engine 634 includes a pattern detection system 642 that identifies code patterns associated with known security vulnerabilities. Code patterns are recurring code structures or programming constructs that may indicate potential security vulnerabilities or established coding practices. The pattern detection system 642 can identify patterns such as functions that accept user input that can allow access for a malicious actor to perform SQL injection, buffer overflows, input validation flaws, and insecure configurations. The LLM integration layer 636 can use an incremental inquiry chain to achieve deterministic outputs from the LLMs. The incremental inquiry chain can include branches based on the response given by the LLM at each step, allowing for conditional processing paths. The system 600 can update the list of prompts based on the response of the LLM, including adding or removing prompts, modifying prompts, or choosing one of multiple branching paths.

The LLM integration layer 636 can determine that assistance data should be provided based on LLM output and supply relevant assistance data when the LLMs are producing output with insufficient detail. The assistance data can include instructions, few-shot prompts, information pertaining to the prepared data, or any combination thereof. The system 600 can include error checking or validation steps that compare the LLM's output at each stage against expected patterns or ranges and trigger additional inquiries if responses are unexpected or inadequate. The system 600 can use constrained decoding as a strategy for improving LLM response determinism. Multiple LLMs can be used in place of a single LLM, where prompting and receiving a response involves processing by one or more of the multiple LLMs with output further processed by subsequent LLMs.

The output and storage layer 644 manages the generation and storage of analysis results. The output and storage layer 644 includes a markdown report generator 646 that generates comprehensive reports formatted using markdown syntax detailing specific vulnerabilities, risk assessments, and recommended remediation steps. The output and storage layer 644 includes a timestamped scan storage 648 that stores timestamped records associated with scan snapshots, enabling preservation of scan histories in a structured format. The timestamped record indicates the security vulnerability and the one or more components through which the security vulnerability propagates. For example, the timestamped record indicates the security vulnerability by storing information such as the vulnerability type, affected file path, line number, severity level, and the date and time when the vulnerability was detected. The timestamped record can indicate a severity level associated with the security vulnerability.

The output and storage layer 644 includes a historical comparison engine 650 that compares timestamped records to prior timestamped records associated with prior scan snapshots of the software repository to determine changes in status of security vulnerabilities and enables trend analysis of security posture over time. The operations can include determining, based on the timestamped record and the prior timestamped record, a trend in at least one of a number of security vulnerabilities detected in the software repository over time, a number of components of the codebase affected by security vulnerabilities over time, changes in statuses of security vulnerabilities over time, or security vulnerabilities detected across the one or more security domains over time. The output and storage layer 644 includes a remediation action planner 652 that generates corrective actions for detected security vulnerabilities based on changes in status. The system 600 sends a report indicating the change in the status of the security vulnerability to the computer device 528.

The system 600 can generate an awareness digest that summarizes or includes information about multiple change requests, including a report of the most high-risk changes being proposed by the change requests. A user interface can display a change request list where each change request is associated with a status indicator indicating a number or severity of security vulnerabilities, a change request name, a codebase name, and a timestamp. The user interface can include a security policy section displaying a natural-language security question and a vulnerability indicator of whether the natural-language security policy corresponds with the detection of an associated security vulnerability. The layers of the system 600 work together to perform comprehensive security scanning by coordinating the orchestration layer 602 to manage workflow, the primary analysis modules 612 to perform initial assessment, the specialized review modules 622 to analyze specific security domains, the AI analysis engine 634 to leverage LLM capabilities, and the output and storage layer 644 to generate reports and store historical data.

Figure 7:
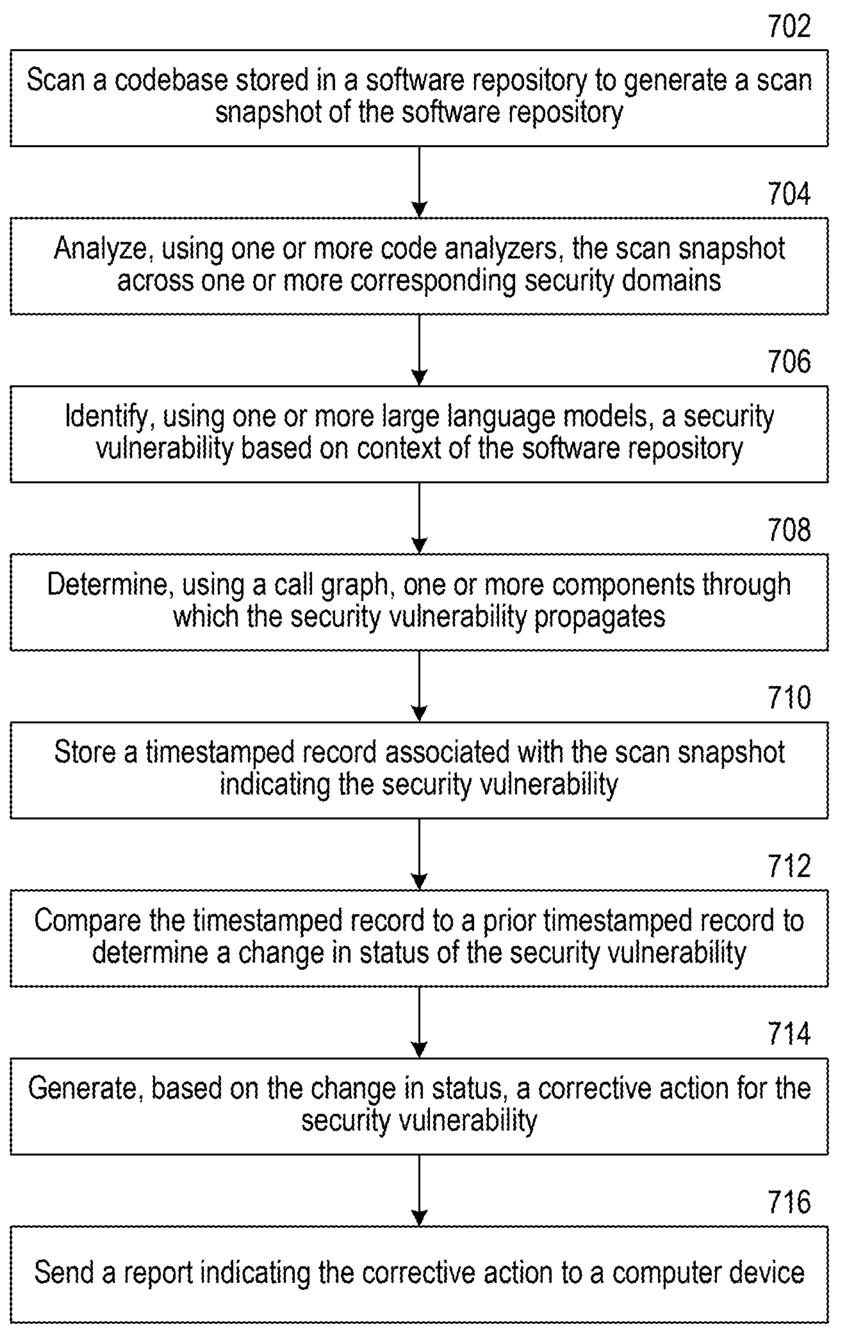
FIG. 7 is a flow diagram that illustrates an example process for scanning software repositories to identify security vulnerabilities in accordance with various embodiments of the present technology.

FIG. 7 is a flow diagram that illustrates an example process for scanning software repositories to identify security vulnerabilities in accordance with various embodiments of the present technology. In some implementations, the process is performed by the systems 500, 600 illustrated and described in more detail with reference to FIGS. 5 and 6. In some implementations, the process is performed by a computer system, e.g., example computer system 900 illustrated and described in more detail with reference to FIG. 9. Likewise, implementations can include different and/or additional steps or can perform the steps in different orders.

The process shown by FIG. 7 can be a method for tracking changes in security posture over time by comparing current scan results with historical records to determine whether security vulnerabilities have been introduced, remediated, or remain present in a codebase. At 702, a system scans a codebase stored in a software repository to generate a scan snapshot of the software repository. The scan snapshot represents a current state of the codebase for analysis and can include file data, file metadata, and file paths associated with the codebase. The file data can include text written in one or more programming languages such as Python, JavaScript, C++, or Ruby. The file metadata can include date of creation, date of previous modification, owner name, and the name of the last user to modify the contents of a directory or file. The file paths can indicate the directory structure and location of files within the codebase. Prior to scanning the codebase, a repository validator can validate that the software repository exists and is accessible. A scan snapshot generator or a code harvest engine can extract and collect code from the software repository for analysis.

At 704, the system analyzes, using one or more code analyzers, the scan snapshot across a corresponding one or more security domains. Each of the one or more code analyzers is associated with a different one of the one or more security domains, and each of the one or more security domains is associated with a different type of security vulnerability. The analyzing is performed based on code patterns, dependency relationships, and/or execution pathways in the scan snapshot. The code patterns can include functions that accept user input, authentication mechanisms, and cryptographic implementations. The dependency relationships can include frameworks such as Django or Ruby on Rails, libraries, and packages used by one or more files of the codebase. The execution pathways can include function call sequences and control flow paths through the codebase. One or more specialized review modules, including an authorization review module, an authentication review module, an injection review module, a cryptographic review module, and/or a configuration review module, can perform the analysis across the corresponding security domains.

At 706, the system identifies, using one or more LLMs, a security vulnerability based on a context of the software repository determined using the scan snapshot. The context can include an application behavior of the codebase, a framework used by the codebase, a component dependency within the codebase, and/or a data storage pattern of the codebase. An LLM engine or an LLM integration layer can process the scan snapshot using NLP to identify the security vulnerability. The security vulnerability can be identified based on analyzing the scan snapshot and the context of the software repository. The system can access a timestamped record associated with a prior scan snapshot of the software repository, where the timestamped record indicates a security vulnerability associated with the prior scan snapshot. The system can determine, using the one or more LLMs, that the security vulnerability is absent from the scan snapshot based on analyzing the scan snapshot and the context of the software repository.

At 708, the system determines, using a call graph, one or more components of the codebase through which the security vulnerability propagates. The call graph is generated based on function calls within the codebase. A call graph analyzer or a call graph analysis engine can generate the call graph and determine the one or more components. The one or more components can include functions, classes, or modules within the codebase. For example, if an SQL injection vulnerability is detected in a function that processes user input, the call graph can identify other functions that call the vulnerable function and can therefore be affected by the vulnerability. The call graph includes execution pathways between functions in the codebase, providing visibility into how vulnerabilities can affect different parts of an application. The system can determine, using the call graph, one or more components of the codebase associated with the security vulnerability in a prior scan snapshot.

At 710, the system stores a timestamped record associated with the scan snapshot. The timestamped record indicates the security vulnerability and the one or more components through which the security vulnerability propagates. A timestamped storage or a timestamped scan storage can store the timestamped record. The timestamped record can indicate a severity level associated with the security vulnerability, such as high, medium, or low severity. The timestamped records enable preservation of scan histories in a structured format that allows for historical comparisons and trend analysis of security posture over time.

At 712, the system compares the timestamped record to a prior timestamped record associated with a prior scan snapshot of the software repository to determine a change in a status of the security vulnerability. A historical comparison engine can perform the comparison. The change in the status can be based on presence or absence of the security vulnerability in the prior timestamped record. The system can determine a change in a status of the security vulnerability based on the timestamped record indicating the security vulnerability is associated with the prior scan snapshot and determining that the security vulnerability is absent from the scan snapshot. The change in the status can indicate a difference between the one or more components indicated in the timestamped record and one or more components indicated in the prior timestamped record. The comparison can determine trends in a number of security vulnerabilities detected in the software repository over time, a number of components of the codebase affected by security vulnerabilities over time, changes in statuses of security vulnerabilities over time, or security vulnerabilities detected across the one or more security domains over time.

At 714, the system generates, based on the change in the status, a corrective action for the security vulnerability. A remediation action planner can generate the corrective action. The system can generate, based on the change in the status, a report indicating that the security vulnerability is remediated. The report can indicate the one or more components of the codebase associated with the security vulnerability in the prior scan snapshot. The report can indicate a code change in the codebase that remediated the security vulnerability, such as identifying the specific file, function, or line of code that was modified to address the vulnerability. The corrective action can include recommended remediation steps for security vulnerabilities that remain present or have been newly introduced.

At 716, the system sends a report indicating the corrective action to a computer device. A report generator or a markdown report generator can generate and send the report. The report can be formatted using markdown syntax and can detail specific vulnerabilities, risk assessments, and recommended remediation steps. The system can send the report indicating that the security vulnerability is remediated to a computer device. The computer device can display the report to development teams, allowing the development teams to view security analysis results and prioritize security improvements.

Artificial Intelligence System

To assist in understanding the present disclosure, some concepts relevant to artificial intelligence (AI) including neural works and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term "DNN" may encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and auto-regressive models, among others.

DNNs are often used as ML-based models for modeling complex behaviors (e.g., human language, image recognition, object classification) in order to improve the accuracy of outputs (e.g., more accurate predictions) such as, for example, as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a language model), the training dataset may be a collection of text documents, referred to as a text corpus (or simply referred to as a corpus). The corpus may represent a language domain (e.g., a single language) or a subject domain (e.g., source code repositories or security vulnerability databases) and/or may encompass another domain or domains, be they larger or smaller than a single language or subject domain. For example, a relatively large, multilingual, and non-subject-specific corpus may be created by extracting text from online web pages, publicly available social media posts, and/or open source code repositories. Training data may be annotated with ground truth labels (e.g., each data entry in the training dataset may be paired with a label indicating presence or absence of authorization checks) or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder) or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data may be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters may be determined based on the measured performance of one or more of the trained ML models, and the first step of training (e.g., with the training set) may begin again on a different ML model described by the new set of determined hyperparameters. In this way, these steps may be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (also referred to as update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (e.g., "learn") the parameters to reduce the loss function. Backpropagation is performed iteratively so that the loss function is converged or minimized. Other techniques for learning the parameters of the ML model may be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters may then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publicly available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to an ML-based language model, there could exist non-ML language models. In the present disclosure, the term "language model" may be used as shorthand for an ML-based language model (e.g., a language model that is implemented using a neural network or other ML architecture), unless stated otherwise. For example, unless stated otherwise, the "language model" encompasses LLMs.

A language model may use a neural network (typically a DNN) to perform natural language processing (NLP) tasks. A language model may be trained to model how words relate to each other in a textual sequence, based on probabilities. A language model may contain hundreds of thousands of learned parameters or in the case of a large language model (LLM) may contain millions or billions of learned parameters or more. As non-limiting examples, a language model can generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

In recent years, there has been interest in a type of neural network architecture, referred to as a transformer, for use as language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (e.g., the order of the input data is meaningful, which is the case for most text input). Although transformer-based language models are described herein, it should be understood that the present disclosure may be applicable to any ML-based language model, including language models based on other neural network architectures such as RNN-based language models.

FIG. 8 is a drawing that illustrates an example process 800 performed by a transformer 812 in accordance with various embodiments of the present technology. A transformer is a type of neural network architecture that uses self-attention mechanisms to generate predicted output based on input data that has some sequential meaning (e.g., the order of the input data is meaningful, which is the case for most text input). Self-attention is a mechanism that relates different positions of a single sequence to compute a representation of the same sequence. Although transformer-based language models are described herein, it should be understood that the present disclosure may be applicable to any ML-based language model, including language models based on other neural network architectures such as RNN-based language models.

The transformer 812 includes an encoder 808 (which can comprise one or more encoder layers/blocks connected in series) and a decoder 810 (which can comprise one or more decoder layers/blocks connected in series). Generally, the encoder 808 and the decoder 810 each include a plurality of neural network layers, at least one of which can be a self-attention layer. The parameters of the neural network layers can be referred to as the parameters of the language model.

The transformer 812 can be trained to perform certain functions on a natural language input. For example, the functions include analyzing source code, identifying security vulnerabilities, and performing contextual reasoning about code structure and logic. Analyzing source code can include examining implementation files and service definition files to understand API endpoint definitions and authorization requirements. Identifying security vulnerabilities can include detecting missing or incorrectly implemented authorization checks that pattern-based approaches may overlook. Performing contextual reasoning can include determining whether code contains direct calls to known authorization functions or indirect authorization logic such as verifying session tokens, verifying roles, or calling other functions that eventually lead to a permission check. The transformer 812 can use semantic understanding rather than rigid syntax matching to facilitate code comprehension, understanding and reasoning about the purpose, interactions, and capabilities of code rather than parsing for stringent structures. In some implementations, the transformer 812 is trained to perform certain functions on other input formats than natural language input. For example, the input can include source code files, interface definition language files, service definition files, or a combination thereof.

The transformer 812 can be trained on a text corpus that is labeled (e.g., annotated to indicate verbs, nouns) or unlabeled. Large language models (LLMs) can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input) and code analysis tasks (e.g., analyzing source code to identify security vulnerabilities or missing authorization checks). FIG. 8 illustrates an example of how the transformer 812 can process textual input data. Input to a language model (whether transformer-based or otherwise) typically is in the form of natural language or source code that can be parsed into tokens. It should be appreciated that the term "token" in the context of language models and natural language processing (NLP) has a different meaning from the use of the same term in other contexts such as data security. Tokenization, in the context of language models and NLP, refers to the process of parsing textual input (e.g., a character, a word, a phrase, a sentence, a paragraph, a line of code, a function name) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some examples, a token can correspond to a portion of a word or a code element such as a function name, variable, or operator.

For example, the word "greater" can be represented by a token for [great] and a second token for [er]. In another example, the text sequence "write a summary" can be parsed into the segments [write], [a], and [summary], each of which can be represented by a respective numerical a code token. Similarly, sequence such as "checkUserHasAccess (ctx)" can be parsed into segments such as [check], [User], [Has], [Access], [(], [ctx], and [)], each represented by respective tokens. In addition to tokens that are parsed from the textual sequence (e.g., tokens that correspond to words, punctuation, or code elements), there can also be special tokens to encode non-textual information. For example, a [CLASS] token can be a special token that corresponds to a classification of the textual sequence (e.g., can classify the textual sequence as a list, a paragraph, or a code block), an [EOT] token can be another special token that indicates the end of the textual sequence, other tokens can provide formatting information, etc.

In FIG. 8, a short sequence of tokens 802 corresponding to the input text is illustrated as input to the transformer 812. Tokenization of the text sequence into the tokens 802 can be performed by some pre-processing tokenization module such as, for example, a byte-pair encoding tokenizer (the "pre" referring to the tokenization occurring prior to the processing of the tokenized input by the LLM), which is not shown in FIG. 8 for simplicity. In general, the token sequence that is inputted to the transformer 812 can be of any length up to a maximum length defined based on the dimensions of the transformer 812. Each token 802 in the token sequence is converted into an embedding vector 806 (also referred to simply as an embedding 806). An embedding 806 is a learned numerical representation (such as, for example, a vector) of a token that captures some semantic meaning of the text segment or code element represented by the token 802. The embedding 806 represents the text segment or code element corresponding to the token 802 in a way such that embeddings corresponding to semantically related text or code are closer to each other in a vector space than embeddings corresponding to semantically unrelated text or code. For example, assuming that the words "write," "a," and "summary" each correspond to, respectively, a "write" token, an "a" token, and a "summary" token when tokenized, the embedding 806 corresponding to the "write" token will be closer to another embedding corresponding to the "jot down" token in the vector space as compared to the distance between the embedding 806 corresponding to the "write" token and another embedding corresponding to the "summary" token. Similarly, in the context of code analysis, an embedding corresponding to a "checkUserHasAccess" token can be closer to an embedding corresponding to a "verifyPermissions" token than to an embedding corresponding to an unrelated function name, enabling the transformer 812 to recognize semantically equivalent authorization functions even when they use different naming conventions.

The vector space can be defined by the dimensions and values of the embedding vectors. Various techniques can be used to convert a token 802 to an embedding 806. For example, another trained ML model can be used to convert the token 802 into an embedding 806. In particular, another trained ML model can be used to convert the token 802 into an embedding 806 in a way that encodes additional information into the embedding 806 (e.g., a trained ML model can encode positional information about the position of the token 802 in the text sequence into the embedding 806). In some examples, the numerical value of the token 802 can be used to look up the corresponding embedding in an embedding matrix 804 (which can be learned during training of the transformer 812).

The generated embeddings 806 are input into the encoder 808. The encoder 808 serves to encode the embeddings 806 into feature vectors 814 that represent the latent features of the embeddings 806. The encoder 808 can encode positional information (e.g., information about the sequence of the input) in the feature vectors 814. The feature vectors 814 can have very high dimensionality (e.g., on the order of thousands or tens of thousands), with each element in a feature vector 814 corresponding to a respective feature. The numerical weight of each element in a feature vector 814 represents the importance of the corresponding feature. The space of all possible feature vectors 814 that can be generated by the encoder 808 can be referred to as the latent space or feature space.

Conceptually, the decoder 810 is designed to map the features represented by the feature vectors 814 into meaningful output, which can depend on the task that was assigned to the transformer 812. For example, if the transformer 812 is used for a code analysis task, the decoder 810 can map the feature vectors 814 into output indicating whether source code contains appropriate authorization checks or identifying potential security vulnerabilities. Generally, in a generative language model, the decoder 810 serves to decode the feature vectors 814 into a sequence of tokens. The decoder 810 can generate output tokens 816 one by one. Each output token 816 can be fed back as input to the decoder 810 in order to generate the next output token 816. By feeding back the generated output and applying self-attention, the decoder 810 is able to generate a sequence of output tokens 816 that has sequential meaning (e.g., the resulting output text sequence is understandable as a sentence and obeys grammatical rules, or the resulting output provides coherent analysis of code structure and security logic). The decoder 810 can generate output tokens 816 until a special [EOT] token (indicating the end of the text) is generated. The resulting sequence of output tokens 816 can then be converted to a text sequence in post-processing. For example, each output token 816 can be an integer number that corresponds to a vocabulary index. By looking up the text segment using the vocabulary index, the text segment corresponding to each output token 816 can be retrieved, the text segments can be concatenated together, and the final output text sequence can be obtained.

In some examples, the input provided to the transformer 812 includes instructions to perform a function on an existing text or source code. The output can include, for example, a modified version of the input text, instructions to modify the text, or an analysis of the input. The analysis can include identifying security vulnerabilities, determining whether authorization checks are present, or detecting missing or incorrectly implemented authorization logic. For example, the input can include source code for an API handler and the output can include an indication of whether the source code contains appropriate authorization checks or a determination that the code lacks an authorization check and should be flagged for manual review.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs. Other LLMs can be trained or fine-tuned on code-based datasets to enable the model to perform code analysis tasks such as identifying security vulnerabilities or determining whether source code contains appropriate authorization checks.

A computer system can access a remote language model (e.g., a cloud-based language model), such as ChatGPT or GPT-3, via a software interface (e.g., an API). Additionally or alternatively, such a remote language model can be accessed via a network such as, for example, the Internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ a plurality of processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Inputs to an LLM can be referred to as a prompt, which is a natural language input that includes instructions to the LLM to generate a desired output. A computer system can generate a prompt that is provided as input to the LLM via its API. As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. For example, a prompt for code analysis can include examples of source code with proper authorization checks and source code lacking authorization checks to guide the LLM in identifying similar patterns. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Computer System

Figure 9:
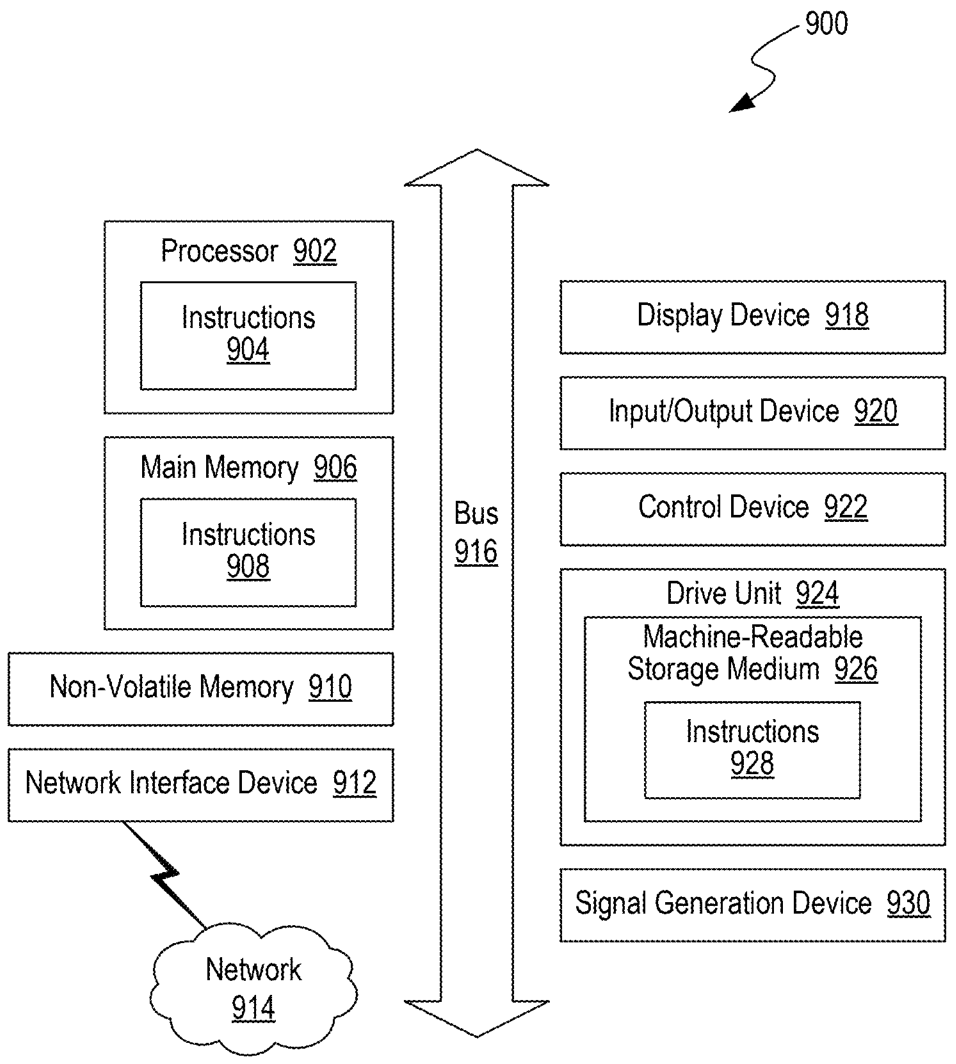
FIG. 9 is a block diagram that illustrates an example of a computer system in which at least some operations described herein can be implemented.

FIG. 9 is a block diagram that illustrates an example of a computer system 900 in which at least some operations described herein can be implemented. As shown, the computer system 900 can include: one or more processors 902, main memory 906, non-volatile memory 910, a network interface device 912, a video display device 918, an input/output device 920, a control device 922 (e.g., keyboard and pointing device), a drive unit 924 that includes a machine-readable storage medium 926, and a signal generation device 930 that are communicatively connected to a bus 916. The bus 916 represents one or more physical buses and/or point-to-point connections that are connected by appropriate bridges, adapters, or controllers. Various common components (e.g., cache memory) are omitted from FIG. 9 for brevity. Instead, the computer system 900 is intended to illustrate a hardware device on which components illustrated or described relative to the examples of the figures and any other components described in this specification can be implemented.

The computer system 900 can take any suitable physical form. For example, the computing system 900 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 900. In some implementations, the computer system 900 can be an embedded computer system, a system-on-chip (SOC), a single-board computer system (SBC), or a distributed system such as a mesh of computer systems or it can include one or more cloud components in one or more networks. Where appropriate, one or more computer systems 900 can perform operations in real time, in near real time, or in batch mode.

The network interface device 912 enables the computing system 900 to mediate data in a network 914 with an entity that is external to the computing system 900 through any communication protocol supported by the computing system 900 and the external entity. Examples of the network interface device 912 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 906, non-volatile memory 910, machine-readable storage medium 926) can be local, remote, or distributed. Although shown as a single medium, the machine-readable storage medium 926 can include multiple media (e.g., a centralized/distributed database and/or associated caches and servers) that store one or more sets of instructions 928. The machine-readable storage medium 926 can include any medium that is capable of storing, encoding, or carrying a set of instructions for execution by the computing system 900. The machine-readable storage medium 926 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 910, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 904, 908, 928) set at various times in various memory and storage devices in computing device(s). When read and executed by the processor 902, the instruction(s) cause the computing system 900 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents, applications, and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A non-transitory, computer-readable storage medium comprising instructions recorded thereon, wherein the instructions, when executed by at least one data processor of a system, cause the system to perform operations including:
- scanning a codebase stored in a software repository to generate a scan snapshot of the software repository;
- analyzing, using one or more code analyzers, the scan snapshot across a corresponding one or more security domains, wherein each of the one or more code analyzers is associated with a different one of the one or more security domains, and wherein each of the one or more security domains is associated with a different type of security vulnerability;
- identifying, using one or more large language models (LLMs), a security vulnerability associated with the scan snapshot, wherein said identifying is based on a context of the software repository determined using the scan snapshot, and wherein the security vulnerability is associated with one of the one or more security domains;
- determining, using a call graph, one or more components of the codebase through which the security vulnerability propagates, wherein the call graph is generated based on function calls within the codebase;
- storing a timestamped record associated with the scan snapshot, wherein the timestamped record indicates the security vulnerability and the one or more components;
- comparing the timestamped record to a prior timestamped record associated with a prior scan snapshot of the software repository to determine a change in a status of the security vulnerability based on presence or absence of the security vulnerability in the prior timestamped record; and
- generating, based on the change in the status, a corrective action for the security vulnerability; and
- sending a report indicating the corrective action to a computer device.

2. The non-transitory, computer-readable storage medium of claim 1, wherein the change in the status indicates a difference between the one or more components indicated in the timestamped record and one or more components indicated in the prior timestamped record.

3. The non-transitory, computer-readable storage medium of claim 1, wherein the operations include:
- determining that a second security vulnerability is indicated in the prior timestamped record;
- determining, using the one or more LLMs, that the second security vulnerability is absent from the scan snapshot; and
- updating, based on determining that the second security vulnerability is absent from the scan snapshot, the timestamped record to indicate a change in a status of the second security vulnerability.

4. The non-transitory, computer-readable storage medium of claim 1, wherein the one or more security domains includes at least one of an authentication mechanism domain, an authorization control domain, a code injection domain, a cryptographic implementation domain, or a configuration management domain.

5. The non-transitory, computer-readable storage medium of claim 1, wherein the context comprises at least one of an application behavior of the codebase, a framework used by the codebase, a component dependency within the codebase, or a data storage pattern of the codebase.

6. The non-transitory, computer-readable storage medium of claim 1, wherein the call graph includes an execution pathway between functions in the codebase.

7. The non-transitory, computer-readable storage medium of claim 1, wherein the report is formatted using markdown syntax.

8. A system comprising:
- at least one hardware processor; and
- at least one non-transitory memory storing instructions, which, when executed by the at least one hardware processor, cause the system to perform operations including:
  - scanning a codebase stored in a software repository to generate a scan snapshot of the software repository;
  - analyzing, using one or more code analyzers, the scan snapshot across a corresponding one or more security domains;
  - identifying, using one or more large language models (LLMs), a security vulnerability associated with the scan snapshot, wherein said identifying is based on a context of the software repository determined using the scan snapshot, and wherein the security vulnerability is associated with one of the one or more security domains;
  - determining, using a call graph, one or more components of the codebase through which the security vulnerability propagates, wherein the call graph is generated based on function calls in the codebase;
  - storing a timestamped record associated with the scan snapshot, wherein the timestamped record indicates the security vulnerability and the one or more components;
  - comparing the timestamped record to a prior timestamped record associated with a prior scan snapshot of the software repository to determine a change in a status of the security vulnerability; and
  - sending a report indicating the change in the status of the security vulnerability to a computer device.

9. The system of claim 8, wherein the operations comprise determining, based on the timestamped record and the prior timestamped record, a trend in at least one of a number of security vulnerabilities detected in the software repository over time, a number of components of the codebase affected by security vulnerabilities over time, changes in statuses of security vulnerabilities over time, or security vulnerabilities detected across the one or more security domains over time.

10. The system of claim 8, wherein the operations comprise storing the scan snapshot in a scan directory for reuse of the scan snapshot across multiple versions of the codebase.

11. The system of claim 8, wherein said analyzing is based on code patterns, dependency relationships, and execution pathways in the scan snapshot.

12. The system of claim 8, wherein the one or more LLMs process the scan snapshot using natural language processing to identify the security vulnerability.

13. The system of claim 8, wherein the timestamped record indicates a severity level associated with the security vulnerability.

14. The system of claim 8, wherein the one or more components comprise at least one of functions, classes, or modules within the codebase.

15. A method comprising:

scanning a codebase stored in a software repository to generate a scan snapshot of the software repository;

accessing a timestamped record associated with a prior scan snapshot of the software repository, wherein the timestamped record indicates a security vulnerability associated with the prior scan snapshot;

analyzing, using one or more code analyzers, the scan snapshot across a corresponding one or more security domains;

determining, using one or more large language models (LLMs), that the security vulnerability is absent from the scan snapshot, wherein said determining is based on (i) said analyzing and (ii) a context of the software repository determined using the scan snapshot;

determining a change in a status of the security vulnerability based on (i) the timestamped record indicating the security vulnerability associated with the prior scan snapshot and (ii) determining that the security vulnerability is absent from the scan snapshot;

generating, based on the change in the status, a report indicating that the security vulnerability is remediated; and sending the report indicating that the security vulnerability is remediated to a computer device.

16. The method of claim 15, wherein the scan snapshot comprises at least one of file data, file metadata, or file paths associated with the codebase.

17. The method of claim 15, comprising validating, prior to scanning the codebase, that the software repository exists and is accessible.

18. The method of claim 15, comprising:

determining, using a call graph generated based on function calls in the codebase, one or more components of the codebase associated with the security vulnerability in the prior scan snapshot, wherein the report indicates the one or more components.

19. The method of claim 15, wherein the report indicates a code change in the codebase that remediated the security vulnerability.

20. The method of claim 15, wherein said analyzing is based on code patterns, dependency relationships, and execution pathways in the scan snapshot.

* * * * *